United States Patent

[11] 3,625,305

[72] Inventors Otto M. Mueller;
    Melvin R. Nordin, both of Lakeville, Minn.
[21] Appl. No. 829,489
[22] Filed June 2, 1969
[45] Patented Dec. 7, 1971
[73] Assignee Viking Engineering and Manufacturing, Inc.
    Lakeville, Minn.

[54] TRANSPORT BASKET AND METHOD OF PRODUCING THE SAME
    2 Claims, 6 Drawing Figs.
[52] U.S. Cl. ................................................ 182/46,
                                     182/2, 182/222, 220/83
[51] Int. Cl. ..................................................... B65d 1/48,
                                                      E04g 5/08
[50] Field of Search ............................................ 182/46;
                                                   182/2; 220/83

[56] References Cited
UNITED STATES PATENTS

| 3,169,602 | 2/1965  | Myers    | 182/46 |
| 3,396,814 | 8/1968  | Garnett  | 182/2  |
| 3,414,079 | 12/1968 | Watch    | 182/46 |
| 3,391,823 | 7/1968  | Tijms    | 220/83 |
| 3,404,751 | 10/1968 | Nosworthy | 182/46 |

Primary Examiner—Reinaldo P. Machado
Attorney—Merchant & Gould

ABSTRACT: A transport basket for raising personnel or material to elevated positions from a vehicle having an elevatable basket supporting structure thereon. The basket comprises a liner of electrical insulating material and an outer rigid jacket covering the exterior surface of the liner. A method of producing the transport basket involves molding the liner in a rotational mold without a core, removing the liner from the mold, and thereafter covering the exterior surface of the liner with glass fiber-impregnated plastic resin.

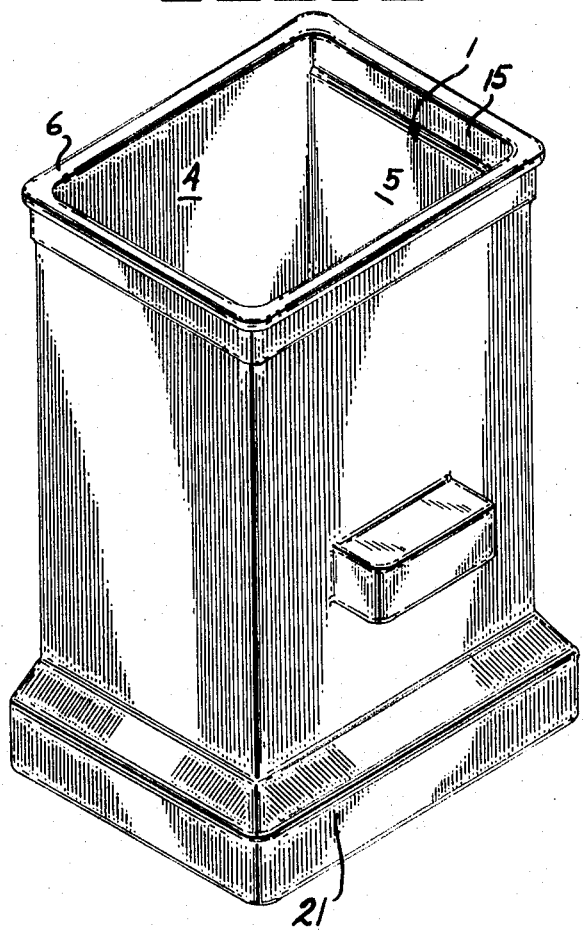
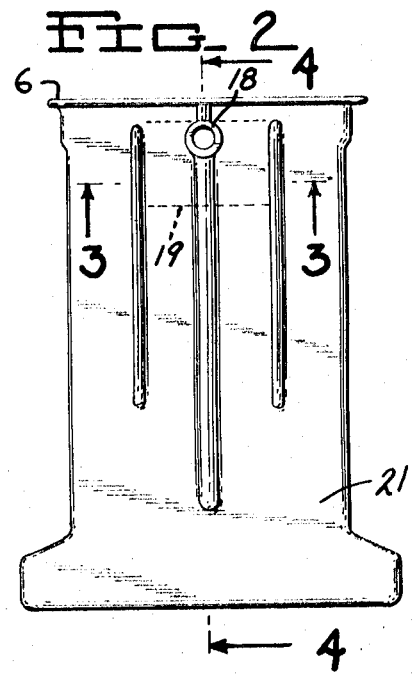
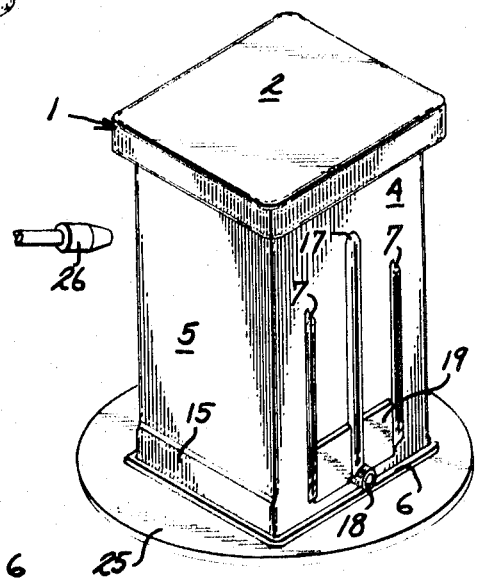
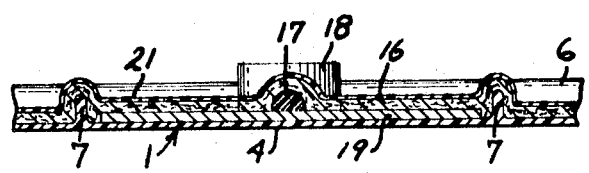
INVENTOR.
OTTO M. MUELLER
MELVIN R. NORDIN
BY Merchant & Gould
ATTORNEYS

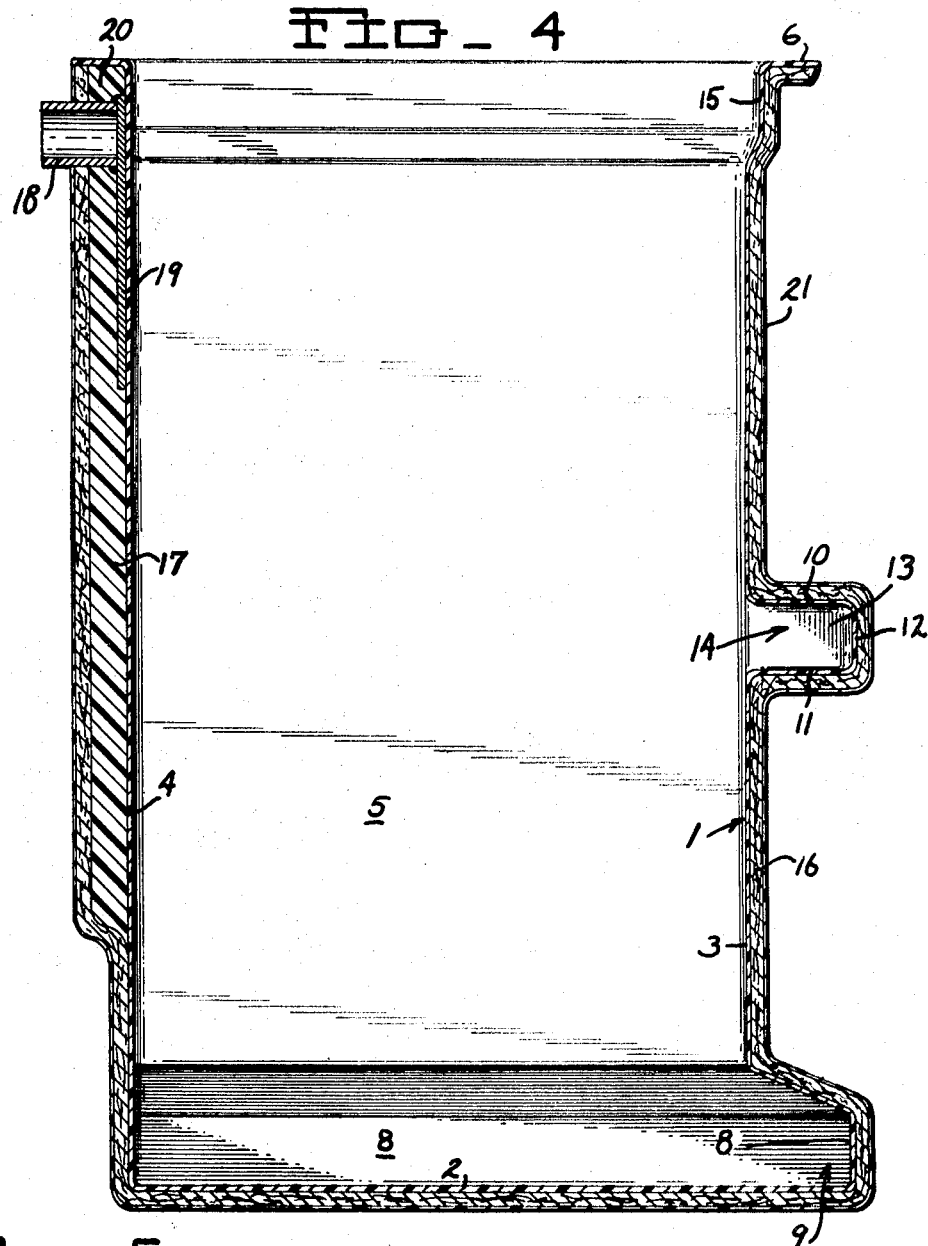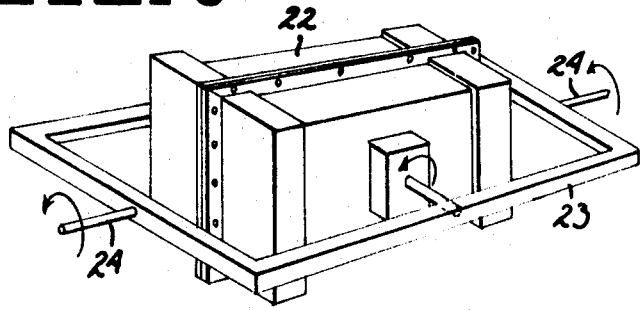

TRANSPORT BASKET AND METHOD OF PRODUCING THE SAME

BACKGROUND OF THE INVENTION

Transport baskets for carrying workmen to elevated positions, from vehicles, are known, particularly in the fields of street lighting maintenance, and tree trimming, outdoor sign work, and others. Such baskets have been heretofore made from molded resins or glass fibers or glass cloth, for mechanical strength and savings in weight. For the purpose of providing electrical insulation, as against possible grounding, for a workman occupying the basket, open-topped insulating liners have been provided. Such liners, usually molded of material having high dielectric strength, have been merely slipped into the baskets after the baskets are finished. These molded liners are mostly semirigid and usually have straight or upwardly diverging sidewalls to enable the same to be placed in the baskets. Some transport baskets have undercut or downwardly diverging sides to provide adequate foot space for an occupant. Liners of the above-mentioned variety, placed therein, materially reduce foot space, and add to the instability of the occupant of the basket when reaching laterally outwardly therefrom. Moreover, such liners are easily removed, and use of a transport basket without the liner often creates a hazard when used in connection with electrical apparatus.

SUMMARY OF THE INVENTION

The transport basket of this invention involves a molded liner of electrical insulating material, such as a thermoplastic resin, and a rigid jacket of glass fiber-impregnated resin. The liner is preferably formed by rotational casting or vacuum thermo forming to provide a bottom wall, a peripheral wall, and an open top, the jacket being applied in fluid form to the outer surfaces of the liner bottom and peripheral walls after removal of the liner from the mold, and cured to a substantially rigid state. The basket is generally rectangular in shape, the peripheral wall including generally flat front and rear walls and sidewalls, the front and sidewalls having laterally outwardly offset portions adjacent the bottom wall defining an inwardly opening recess for the feet of the occupant. One of the walls of the basket is formed to provide a second laterally outwardly projecting hollow step portion defining an inwardly opening recess above the level of the above-mentioned recess, to aid the occupant in entering and leaving the basket.

DESCRIPTION OF THE DRAWINGS

FIG. 1 is a view in perspective, as seen from the top, front and one side, of a transport basket produced in accordance with this invention;

FIG. 2 is a view in rear elevation, on a reduced scale;

FIG. 3 is an enlarged fragmentary section taken on the line 3—3 of FIG. 2;

FIG. 4 is a vertical section taken on the line 4—4 of FIG. 2;

FIG. 5 is a view in perspective of a rotational mold for producing the liner section of the transport basket; and FIG. 6 is a view in perspective of the liner section, illustrating a step in the method of producing the completed transport basket.

DETAILED DESCRIPTION

The transport basket of this invention is open-topped, and may be made in any desired shape, such as generally cylindrical or rectangular. For the purpose of the present example, the basket is shown as being generally rectangular, and comprises a liner section 1 of material having high electrical insulating characteristics, such as polyethylene or other suitable material which may be easily molded; and a rigid outer casing or jacket of other material, such as glass fiber-impregnated resin. The liner section 1 is formed to provide a generally horizontally disposed flat bottom wall 2, generally vertically disposed front and rear walls 3 and 4 respectively, and laterally disposed generally vertical sidewalls 5. The open top of the liner 1 is encompassed by a horizontally disposed marginal flange 6. The rear wall 4 of the liner 1 is formed to provide a pair of laterally spaced generally vertical reinforcing ribs 7, see particularly FIGS. 3 and 6. The front and sidewalls 3 and 5 respectively are formed to provide laterally outwardly offset portions 8 which define a laterally inwardly opening recess 9 that extends continuously about the side and front walls of the liner 1, the opposite ends of the recess being defined by the rear wall 4 adjacent the bottom wall 2. The front wall 3 intermediate the recess 9 and top marginal flange 6 is further formed with a laterally outwardly projected or offset portion of generally rectangular form, having top and bottom wall portions 10 and 11 respectively, a front wall portion 12, and opposite sidewall portions 13, the wall portions defining a laterally inwardly opening recess 14 in upwardly spaced relation to the underlying portion of the recess 9. As shown, the upper end portions of the front and sidewalls 4 and 5 respectively are formed to provide laterally outwardly offset portions 15 adjacent the marginal flange 6 to impart rigidity to the liner 1 adjacent the open upper end thereof.

The outer surface of the liner 1 is covered by a rigid jacket 16 preferably made from glass fiber-impregnated resin or similar material having substantially greater mechanical strength and rigidity than that of the liner 1. As shown, the jacket 16 covers the entire bottom, front, rear and sidewalls of the liner 1 including the undersurfaces of the marginal flange 6.

A vertically extending rib 17, of glass fiber-impregnated resin or other suitable material, is mounted on the rear wall 4 intermediate the ribs 7 thereof, and is covered by the jacket 16. An attachment member 18, by means of which the transport basket is secured to a lifting boom or similar elevating mechanism, comprises a boss 18 projecting rearwardly from the upper end portion of the rear wall 4, and an anchoring plate 19 disposed in face-to-face engagement with the outer surface of the rear wall 4 and held thereagainst by the upper end portion of the rib 17, the jacket 16, and a short rib section 20 underlying the marginal flange 6 and aligned with the rib 17. If desired, the anchoring plate 19 may be secured to the rear liner wall 4 by suitable adhesives, not shown. In the embodiment of the invention illustrated, the jacket 16 is covered with a relatively thin coat 21 of paint of insulating material such as polyethylene or other thermoplastic material having high dielectric strength.

The transport basket, being made primarily of synthetic plastic resin, is light in weight, requiring little power to elevate and manipulate the same in use. The inwardly opening recess adjacent the bottom wall 2 provides ample insulated space for the toe portions of the operator's shoes, enabling the operator to stand more closely to the insulated front and sidewalls 3 and 5 and more comfortably lean thereagainst when reaching outwardly from the basket to perform required activity at arm's length. The outwardly projected portion of the front wall 1, defining the recess 14, provides both an interior and an exterior step for assisting the user in entering or leaving the basket.

The producing of a transport basket of the general type above described, and including a liner of insulating material having recessed portions such as the recesses 9 and 14 therein, and by the usual fabricating or molding processes, is difficult and highly expensive. Further as above indicated, baskets with removable liners are apt to be used without benefit of the safety liners. In order to produce an inexpensive and lightweight basket of the required strength and insulating qualities, we have developed the following method of producing the same without the necessity of using molds having complex core structures. In one method of producing the present transport basket, the liner 1 is formed by introducing a charge of thermoplastic material, such as polyethylene into a split hollow mold of the type illustrated in FIG. 5 and indicated at 22. The mold 22 is devoid of a core and is mounted for rotation on a transverse axis within a frame 23 which in turn is provided with trunnions or the like 24 disposed on an axis transversely of the axis of rotation of the mold 22. The mold 22 is heated to the melting temperature of the charge of thermoplastic material therein and rotated on the axis of its mounting to the frame 23, while the frame 23 is rotated on the axis of the trunnions 24, the process being well known as rotational casting. As the heated mold 22 is thus rotated on two axes, the melted charge of liner material coats the inner surface of the mold to a uniform thickness, after which the mold is cooled, the mold sections separated, and the liner 1 removed therefrom. The attachment member 18 and central rib 17 are then adhered to the rear wall 4, and the liner 1 placed on a suitable support 25 in an inverted condition, see FIG. 6. With the exception of the top surface of the marginal flange 6, the entire outer surface of the liner 1 is then covered to a desired thickness with glass fiber-impregnated resin, such as a polyester or epoxy resin, and the same permitted to cure to a hardened solid state. In FIG. 6, the glass fiber and resin mixture is shown as being sprayed on the outer surface of the liner 1 by means of a conventional spray nozzle 26. Optionally, the jacket 16 may be produced by applying alternate layers of resin and woven glass cloth to the exterior surface of the liner 1 until a jacket 16 of desired thickness is achieved. After the jacket 16 has thoroughly cured, the outer surface thereof may be coated with a layer 21 of plastic insulating material, such as polyethylene, or other high dielectric thermoplastic material, if desired.

It will be appreciated that the safety liner can be produced in other ways, such as by thermo forming, centrifugally cast, or by blow molding.

The above-described method of producing a transport basket is relatively simple and inexpensive, and produces a basket that is light in weight and of substantial dielectric and mechanical strength, and which may be easily entered and as easily vacated. The liner 1 is securely anchored within the jacket, and due to the larger area at the bottom thereof than at its open top, removal thereof from the jacket may be accomplished only with extreme difficulty. As a matter of fact, producing a liner as above described eliminates the necessity for removing the liner from the jacket.

What is claimed is:

1. A transport basket comprising:
   a. an open topped, generally rectangular liner of molded electrical insulating material having a generally flat bottom wall, and a peripheral wall including generally vertically disposed front, rear and sidewall elements;
   b. said peripheral wall including a laterally outwardly offset portion adjacent said bottom wall, said offset portion cooperating with said bottom wall to define a laterally inwardly opening recess;
   c. a rigid jacket of glass fiber-impregnated resin covering the exterior surface only of said bottom and peripheral walls of the liner;
   d. and an attachment member projecting rearwardly from said rear wall element and including an enlarged anchoring portion parallel to said rear wall element and disposed between said liner and jacket and anchored therebetween.

2. The transport basket defined in claim 1 in which said front and sidewalls each include said outwardly offset portion, said recess extending continuously about the sides and front of said basket and having opposite ends adjacent said rear wall.

* * * * *